(12) United States Patent
Kamishima

(10) Patent No.: US 6,297,461 B1
(45) Date of Patent: Oct. 2, 2001

(54) KEYBOARD SWITCH

(75) Inventor: Osamu Kamishima, Toyama (JP)

(73) Assignee: SMK Corporation (JP)

(*) Notice: Subject to any disclaimer, the term of this patent is extended or adjusted under 35 U.S.C. 154(b) by 0 days.

(21) Appl. No.: 09/687,723

(22) Filed: Oct. 13, 2000

Related U.S. Application Data

(63) Continuation of application No. PCT/JP99/07109, filed on Dec. 17, 1999.

(51) Int. Cl.$^7$ .................................................. H01H 9/26
(52) U.S. Cl. ........................................ 200/5 A; 200/344
(58) Field of Search .................. 200/19.18, 19.36, 200/28, 5 A, 341–344

(56) References Cited

U.S. PATENT DOCUMENTS

| 4,529,849 | * | 7/1985 | Kamei et al. ................ 200/5 A |
|---|---|---|---|
| 5,488,210 | * | 1/1996 | Shigetaka et al. ............ 200/344 |
| 5,770,824 | * | 6/1998 | Tsai et al. .................... 200/5 A |
| 5,894,117 | * | 4/1999 | Kamishima .................. 200/344 |
| 5,914,468 | * | 6/1999 | Nishimura et al. ........... 200/5 A |

FOREIGN PATENT DOCUMENTS

| 4065037 | 3/1992 | (JP) . |
| 6084425 | 3/1994 | (JP) . |
| 11345535 | 12/1999 | (JP) . |

* cited by examiner

Primary Examiner—Paula Bradley
Assistant Examiner—Nhung Nguyen
(74) Attorney, Agent, or Firm—Morrison Law Firm

(57) ABSTRACT

A keyboard switch actuates a switch sheet from a first position to a second position and correspondingly narrows a gap between a key top and the switch sheet. In keyboard switch operation, trailing claw pieces cause a cross-link to submerge allowing the switch sheet to accommodate an integrally formed return springwithout elastic deformation.

18 Claims, 9 Drawing Sheets

KEYBOARD SWITCH

This application is a continuation of PCT/JP99/07109 filed Dec. 17, 1999.

BACKGROUND OF THE INVENTION

1. Field of the Invention

The present invention relates to a keyboard switch for a lidded computer case. More particularly, the present invention relates to a keyboard switch that retracts multiple key switches from a stand-by orientation to a narrower storage orientation.

2. Description of the Prior Art

Conventionally known is a keyboard switch that retracts a plurality of key switches to a storage orientation within a lidded computer case.

A shown in FIGS. 7 through 9, a conventionally known keyboard switch (not shown) contains a plurality of key switches 100 each containing a cross-link 101. Each cross-link 101 includes a first link member 101a and a second link member 101b pivotably coupled at intermediate pivot points 101c. Each cross-link 101 is located between a key top 102 and a support plate 107.

A bottom end of first link member 101a hinges to a hinged end portion 110 and couples pivotally to a support projection 109 formed from support plate 107. A top end of first link member 101a, having a pivotal and slidable end portion 111, engages a guide portion 105 formed on the underside of key top 102. Thus, first link member 101a both pivots and slides in a left-to-right direction in FIGS. 7 through 9.

A bottom end of second link member 101b, having a pivotable and slidable end portion 112, engages an engagement long hole 108. A top end of second link member 101b hinges to a hinged end portion 113 and couples pivotally to the underside of key top 102.

In FIG. 7, keyboard switch 100 is shown in a stand-by position. A dome shaped rubber elastic portion 114 is disposed under key top 102, and serves as a return spring. Elastic portion 114 is in contact with the underside of a depressing portion 106 projected perpendicularly from the bottom side of key top 102.

Elastic portion 114 is formed integrally with a rubber sheet 104 on switch sheet 103. A membrane switch portion 103a is formed integrally with switch sheet 103. Switch sheet 103 is disposed continuously under keyboard switch 102. Rubber sheet 104 and switch sheet 103 are slidable together on support plate 107.

Depressing key top 102 (from above in FIG. 7) causes key top 102, guided by cross-link 101, to lower in parallel with switch sheet 103, toward switch sheet 103, without significantly inclination. Depressing key top 102, depresses depressing portion 106 and deforms elastic portion 114. Deformed elastic portion 114 contacts and actuates membrane switch portion 103a.

In FIG. 8, keyboard switch 100 is shown in a fully depressed position. In a fully depressed position, deformed elastic portion 114 contacts switch portion 103a.

A computer unit case, mounting a keyboard switch, connects rotatably with a lid 115 which covers key tops 102 in a closing motion.

In FIG. 9, as lid 115 closes, rubber sheet 104 and switch sheet 103, slide relative to support plate 107 (leftward in FIG. 9), in response to the closing motion. Thus, deformed elastic portion 114 retracts into a storage recessed portion 116 formed under key top 102.

When deformed elastic portion 114 retracts, key top 102 and cross-link 101 drop due to their own weight provide a low profile. When deformed elastic portion 114 retracts, it does not contact switch portion 103a.

Retracting elastic portion 114 into storage recessed portion 116 allows elastic portion 114 to return to an original dome shape. Retracting elastic portion 114 into storage recess 116 also removes contact with depressing portion 106. As a result, conventional key switch 100 allows computer units to reduce overall thickness during the closing of lid 115. However, the distance between support plate 107 and key top 102 may not be made less than the free-state height of elastic portion 114 thus limiting the minimum thickness of the computer unit.

Furthermore, the need for depressing portion 106 and storage recess 116, cause each key top 102 and, hence keyboard switch 100, to be correspondingly larger. Additionally, retracting return spring 114 into storage recess portion 116 requires sliding, thereby requiring the lid 115 mechanism to be larger and more complex. Also, sliding integral rubber sheet 104 and elastic portion 114 require a relatively large force.

A conventional keyboard switch (not shown) allows rubber sheet 104 and integral elastic portion 114 to slide relative to switch sheet 103. However, this type of conventional keyboard switch has a possibility of malfunction. To limit this possibility, a friction-limiting membrane, for example polyester, has been placed between rubber sheet 104 and switch sheet 103, thus increasing cost.

OBJECTS AND SUMMARY OF THE INVENTION

It is an object of the present invention to provide a thinner keyboard switch that does not compress a return spring during a closing motion.

It is another object of the present invention to provide a keyboard switch with a return spring means movable to a retracted position.

It is another object of the present invention to provide a keyboard switch with a simplified configuration where a return spring means is integral with a cross-link or a key top.

It is another object of the present invention to provide a keyboard switch, without a friction-limiting membrane, that allows a lidded computer case to open and close with little operational force.

In a closing operation, a keyboard switch actuates a switch sheet and a support plate from a stand-by position to a retracted position and correspondingly narrows a gap between a key top and the switch sheet. In the closing operation, trailing claw pieces cause a cross-link to submerge thereby allowing a switch sheet to accommodate an integrally formed return spring, thus allowing the return spring to retract without being elastically deformed. At the retracted position, the return spring is accommodated inside a retracting hole in the switch sheet.

According to an embodiment of the invention, there is provided a keyboard switch in a lidded device case comprising: a support plate within the device case, a cross-link, mounted between support projections of the support plate and a key top, the cross-link guides the key top up and down, a switch sheet arranged slidably on the support plate avoids contact with the support projections, and provides a switch portion, formed on and actuated by the key top, a return spring attached integrally to the key switch contacts the switch sheet for biasing the lowered key top upwardly, an interlock mechanism for sliding at least one of the switch sheet and the support plate relative to the other from a stand-by position to a retracted position in response to a closing operation of a lid covering the key top and sustains the key top in a lowered state, the keyboard switch for sliding the switch portion actuated by lowering the key top from the stand-by position to the retracted position where the switch portion is not actuated by lowering the key top.

According to another embodiment of the invention there is provided a keyboard switch further comprising: a retracting hole formed in a portion of the switch sheet, and in a retracted position, part of the return spring is accommodated inside the retracting hole.

According to another embodiment of the invention there is provided a keyboard switch further comprising: engagement holes into which trailing claw pieces integrally provided on the cross-link insert, where at least one of the switch sheet and the support plate slides to the retracted position, peripheral edges of the engagement holes contact with the trailing claw pieces to cause the cross-link to submerge and the key top to lower.

According to another embodiment of the invention there is provided a keyboard switch further comprising: a return spring means, the return spring serving as an actuator for the switch portion and upwardly biasing the key top.

According to another embodiment of the invention there is provided a switch sheet further comprising: slits formed integrally with the switch sheet, the slits formed on the switch sheet to fit the support projections of the support plate and serve as guide means for the support projections.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
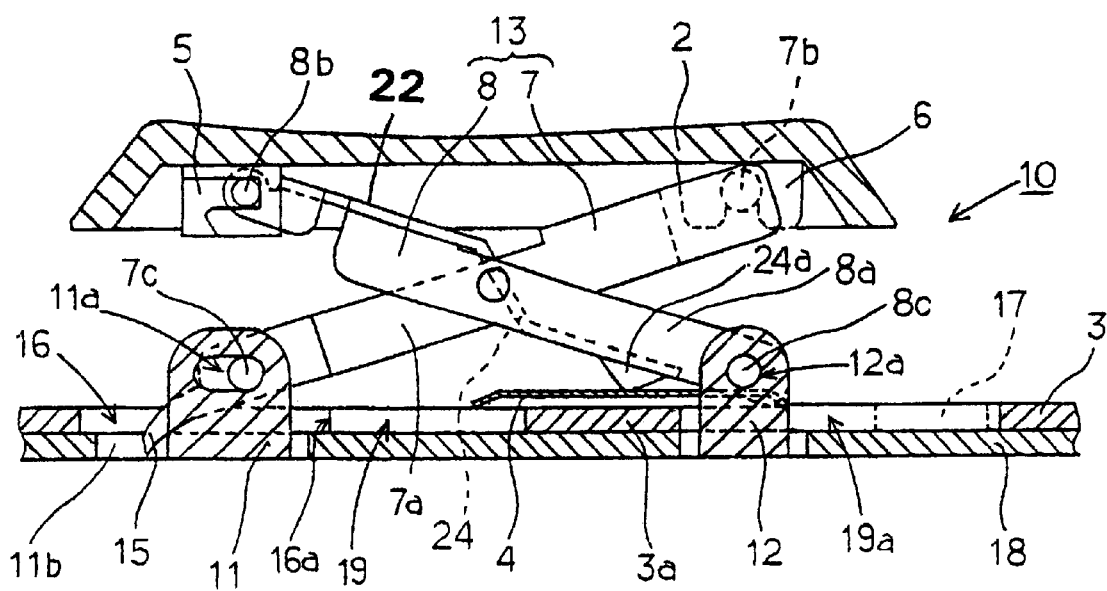
FIG. 1 is a cross-sectional view illustrating an embodiment of the invention in a stand-by position for a key switch.
Figure 2:
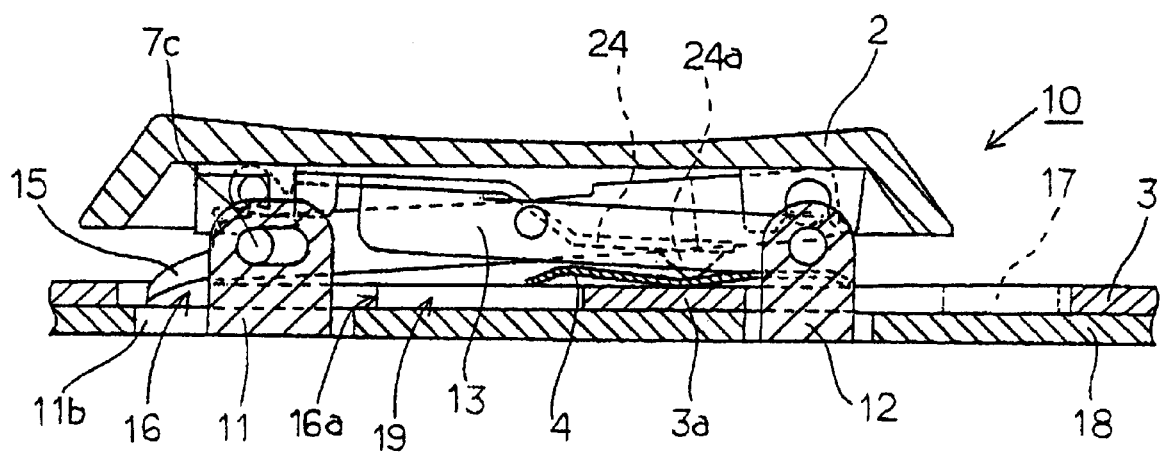
FIG. 2 is a cross-sectional view illustrating an embodiment of the invention in a depressed position for a key switch.
Figure 3:
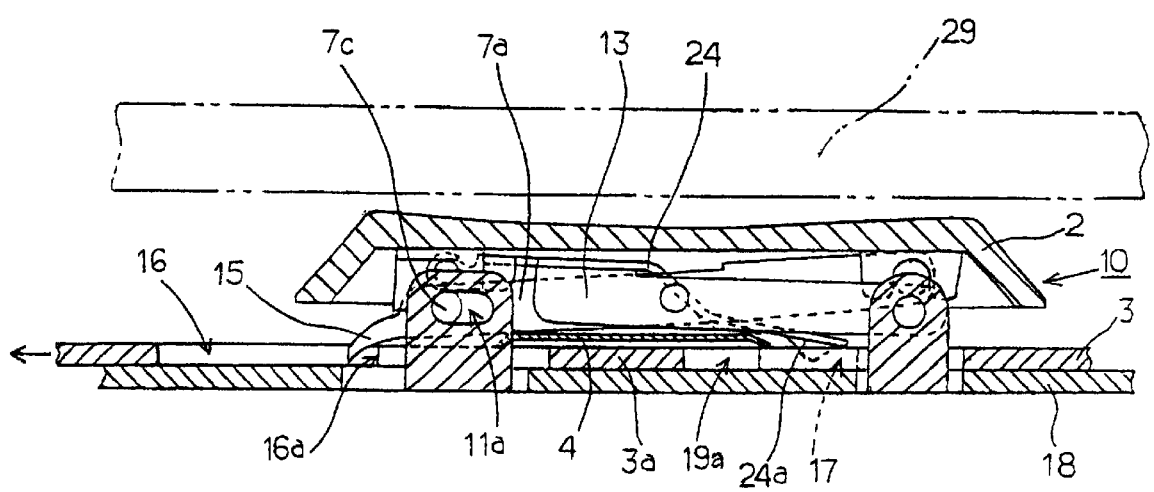
FIG. 3 is a cross-sectional view illustrating an embodiment of the invention in a retracted position for a key switch and a lid.

Referring to FIGS. 1 through 3, a key switch 10, is arranged on a support plate 18. Key switch 10 includes a key top 2, a cross-link 13 containing an inner link 7 and an outer link 8, connecting, to a switch sheet 3 with an integrally formed membrane switch portion 3a.

Inner link 7 contains a pair of arm portions 7a, a pair of pivot axes 7b, and a pair of slidable projections 7c. Arm portions 7a are continuously provided with a pair of trailing claw pieces 15. Trailing claw pieces 15, shaped in a diagonal arc, are projectable through a pair of engagement holes 16, each having a rare edge 16a and an integrally formed guide slit 19 formed in switch sheet 3. Switch sheet 3 also integrally forms a circular retracting hole 17 and a second pair of rear guide slits 12a for each key switch 10.

Outer link 8 contains a pair of arm portions 8a, a pair of slidable projections 8b, and a pair of pivot axes 8c.

Cross-link 13, comprising inner link 7 and outer link 8, is pivotally connected and crossed at respective intermediate longitudinally portions of arm portions 7a and 8a.

At a rear portion of key top 2 (on the right in FIG. 1), a pair of U-shaped bearing portions 6, formed integrally with key top 2, pivotally support and retaining inner link pivot axes 7b. At a front portion of key top 2 (on the left in FIG. 1), a pair of guide receiving portions 5, formed integrally with key top 2, pivotally and slidably guide outer link slidable projections 7b.

Cross-link 13 is interposed between a bottom side of key top 2 and a pair of front support projections 11 (on the left in FIG. 1) and a pair of rear support as, projections 12 (on the right in FIG. 1). Support projections 11, 12, formed by cutting and erecting part of support plate 18, project through switch sheet 3 (vertically in FIG. 1)

Each front support projection 11 contains a long hole 11a, for pivotally and slidably guiding inner link slidable projection 7c, and a punch hole hole 11b formed in support plate 18.

Each rear support projection 12 contains a circular hole 12a, for pivotally supporting outer link pivot axis 8a.

Thus, inner link 7 is supported pivotally and slidably back and forth and outer link 8 is supported pivotably and slidably back and forth. Cross-link 13 is therefore pivotally and slidably connected to key top 2 and support plate 18. When depressing keyboard switch 10, from the top in FIG. 1, key top 2 is freely guided by means of cross-link 13 while being kept primarily in a horizontal plane.

An elongated plate spring piece 24 is integrally and continuously formed on outer link 8 between pivot axes 7c and a connecting plate 22. Connecting plate 22 extends between pivot axes 7c and plate spring piece 24. Spring piece 24, has a conical contact portion 24a, formed by embossing, and extends in a cantilever manner diagonally and downwardly, at a rear portion of connecting plate 22. Spring piece 24 elastically contacts the surface of switch sheet 3 on a membrane switch portion 3a.

In FIG. 1, key switch 10 is shown in a stand-by position. In the stand-by position, contact portion 24a contacts a dish spring 4, placed on switch sheet 3, directly above membrane switch portion 3a. A defined switch portion includes membrane switch portion 3a and dish spring 4 above membrane switch portion 3a.

Membrane switch portion 3a includes a movable contact (not shown) and a stationary contact (not shown) printed on flexible sheets stacked one on the other with an insulating spacer interposed to allow the sheets to face to one another with a slight gap being left between. Dish spring 4, made from a substantially elastic metal plate formed into a circular dish shape having a flanged peripheral rim. The peripheral rim of dish spring 4 is adhered to the flexible sheets and is thereby fixedly attached to switch sheet 3 above membrane switch portion 3a.

At the stand-by position, contact portion 24a of plate spring piece 24 elastically contacts dish spring 4, and upwardly biases outer link 8 (vertically in FIG. 1). Consequently, key top 2 is held at the stand-by position by means of the cross-link 13.

In FIG. 2, depressing key top 2 causes key top 2 to lower in a parallel plane by means of cross-link 13. Thus, contact portion 24a, of plate spring piece 24, depresses and deforms dish spring 4. Deforming dish spring 4 causes contact between movable contact and stationary contact (described above), thereby activating membrane switch portion 3a.

Releasing key top 2 causes dish spring 4 to return by its own elastic bias, thereby deactivating the switch portion. Releasing key top 2, also energizes cross-link 13 to push upwardly by means of returning plate spring, piece 24, thereby causing key top 2 to return to the stand-by position.

In FIG. 3, a closed lid 29 retracts key top 2, creating a retracted position as shown. When retracting, switch sheet 3 shifts left relative to the cross-link 13 attached to support plate 18. Accordingly, switch sheet 3 causes rear edges 12a of the engagement holes 16 to contact trailing claw pieces 15 and arm portions 7a of inner link 7 to rotate about slidable projections 7c within long holes 101a. Consequently, cross-link 13 submerges and key top 2 is lowered, thus allowing a device case 14 (later shown in FIG. 5), with lid 29 covering key tops 2, to be made thinner and with fewer pieces.

At the retracted position, contact portion 24a of plate spring piece 24 is accommodated in retracting hole 17 formed in switch sheet 3. This allows plate spring piece 24 to be accommodated inside the device case 14 without being elastically deformed. Accordingly, this limits the occurrence of fatigue or plastic deformation of the plate spring piece 24.

Furthermore, dish spring 4 and membrane switch portion 3a, previously deflected by contact portion 24a of plate spring piece 24, retract leftward (in FIG. 3) by the sliding of switch sheet 3. This motion allows dish spring 4 and membrane switch portion 3a to return to a non-deflected position. This motion prevents key switch 10 from malfunctioning due to the lowering of key top 2 and provides a long life to the keyboard switch.

Figure 4:
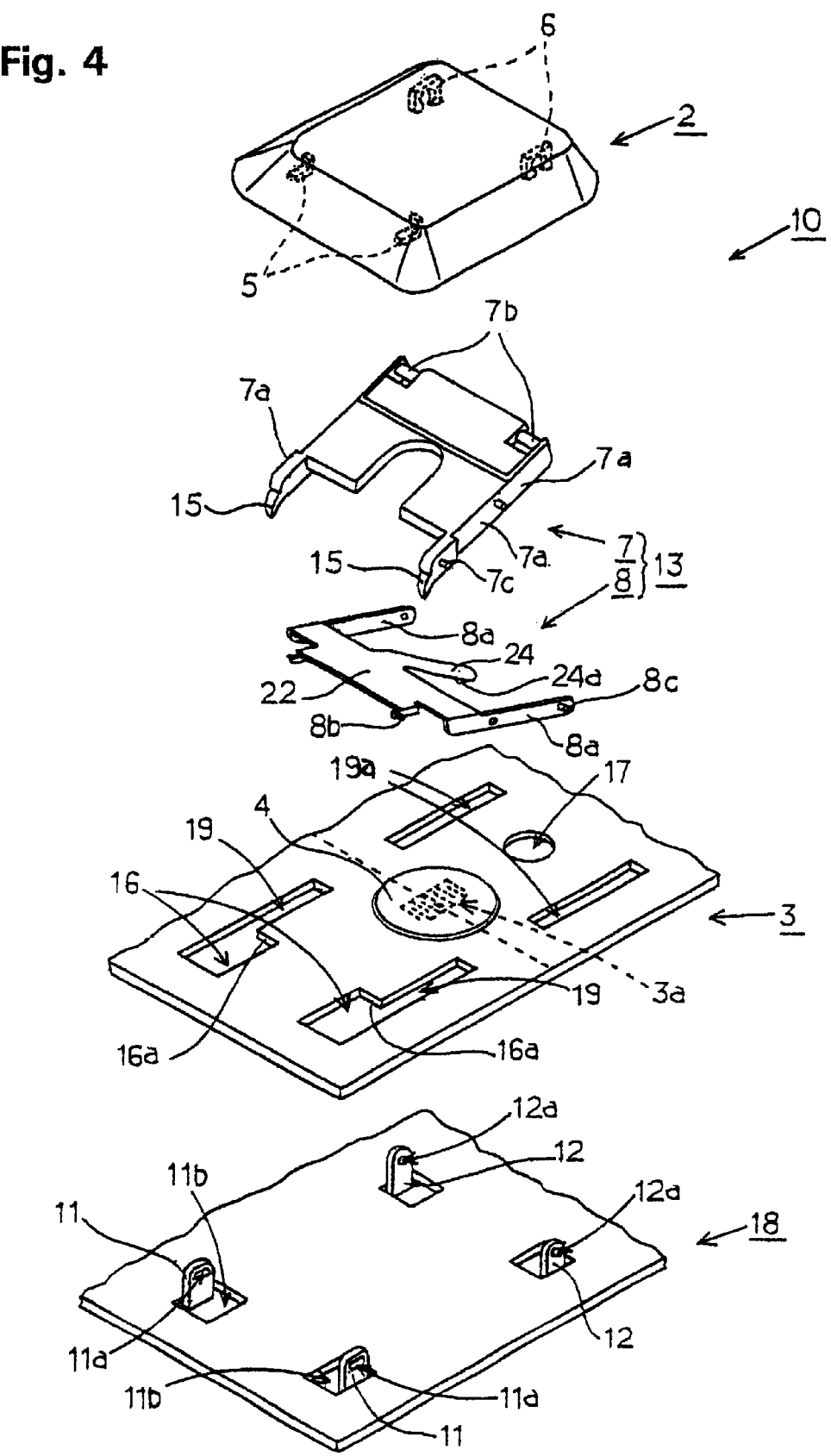
FIG. 4 is an exploded view illustrating an embodiment of the key switch components.

As shown in FIG. 4, switch sheet 3 is arranged slidably back and forth relative to support plate 18. Guide slits 19 are bored at positions where front support projections 11 and rear support projections 12 protrude therethrough. This allows switch sheet 3 to slide without interfering with front support projections 11 or rear support projections 12. The width of each guide slit 19 is larger than the thickness of each front support projection 11 and each rear support projection 12. Guide slits 19 thereby allow switch sheet 3, guided by means of front and rear support projections 11, 12, to slide back and forth.

The inner sides of guide slits 19 into which front support projections 11 insert, connect continuously with engagement holes 16 thus allowing trailing claw pieces 15 of inner link 7 to penetrate a surface plane of switch sheet 3. When the switch sheet 3 slides to a retracted position, trailing claw pieces 15 contact rear edges 12a of engagement holes 16 and are pushed upwardly. Trailing claw pieces 15 cause arm portions 7a, 7a of the inner link 7 to rotate about slidable projections 7c and thus allow arm portions 7a, 7a to recline.

Figure 5:
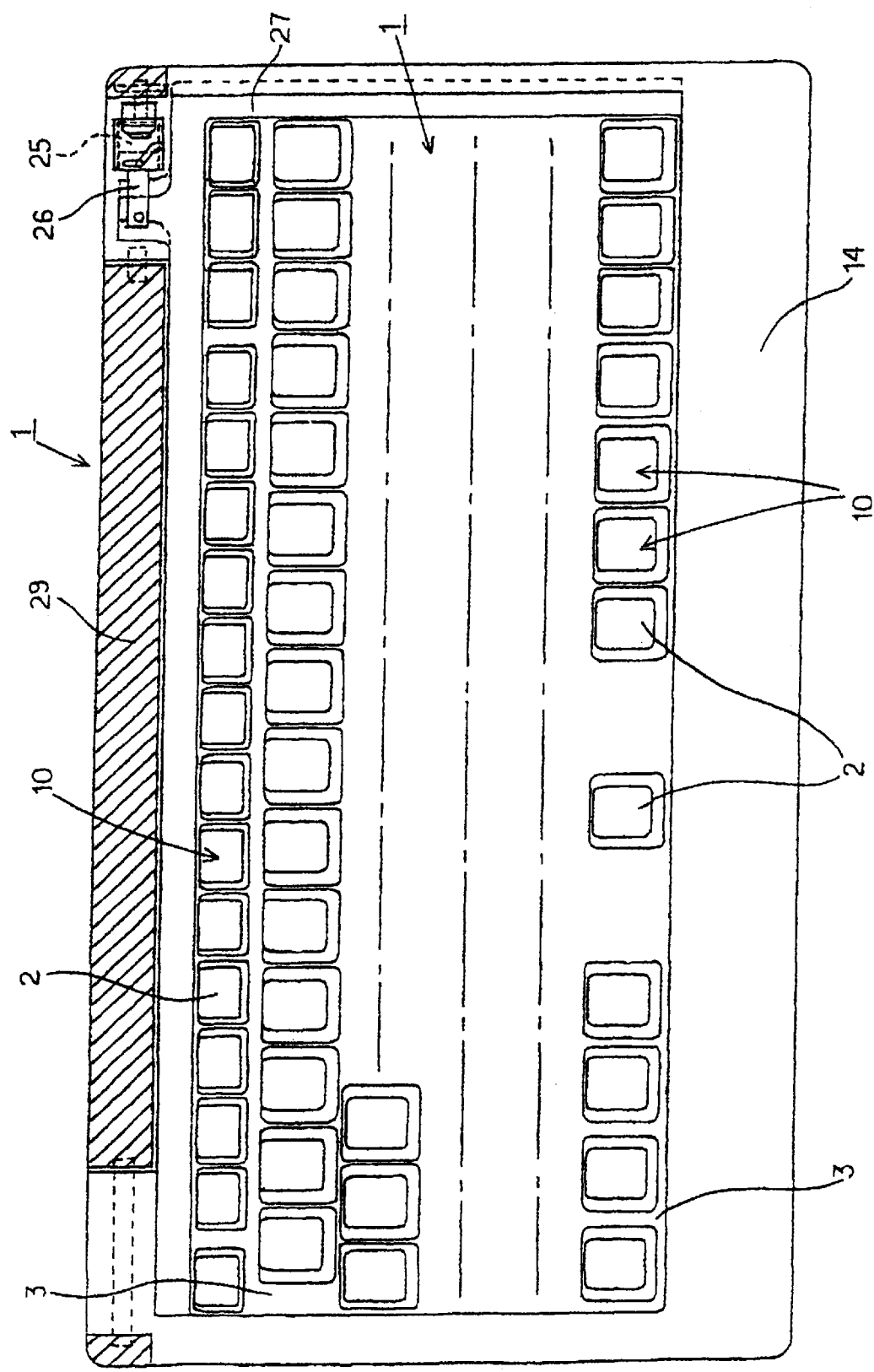
FIG. 5 is a plan view illustrating an open lid and keyboard switch with interlocking mechanism of the present embodiment.
Figure 6:
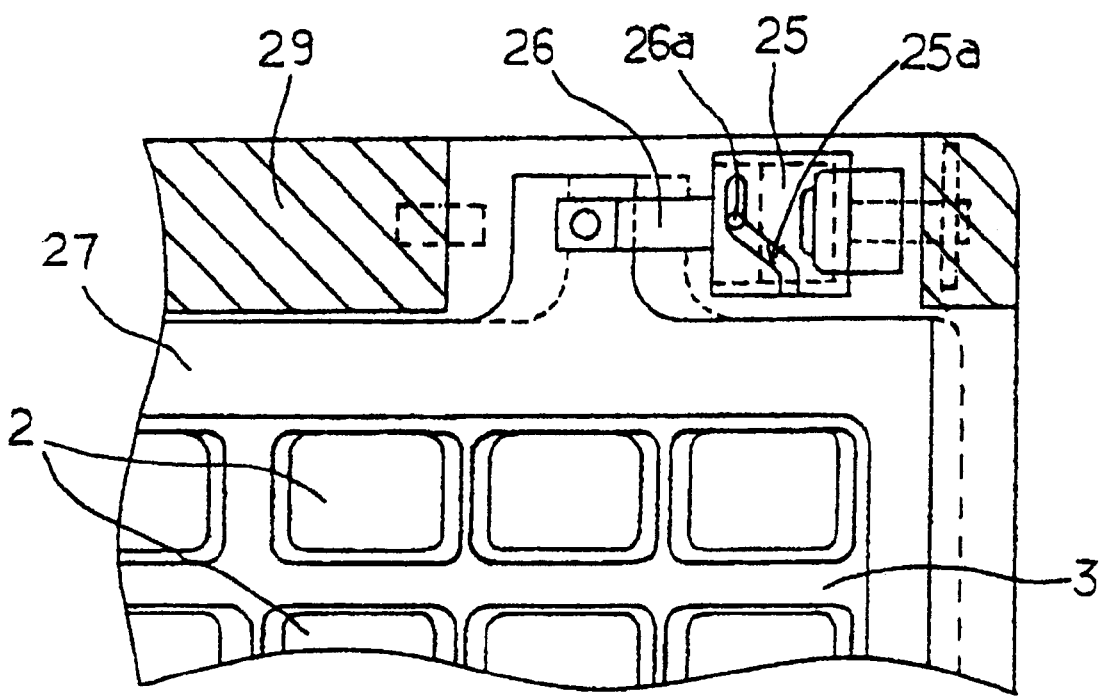
FIG. 6 is an enlarged plan view illustrating the main portion of the interlocking mechanism shown in FIG. 5.
Figure 7:
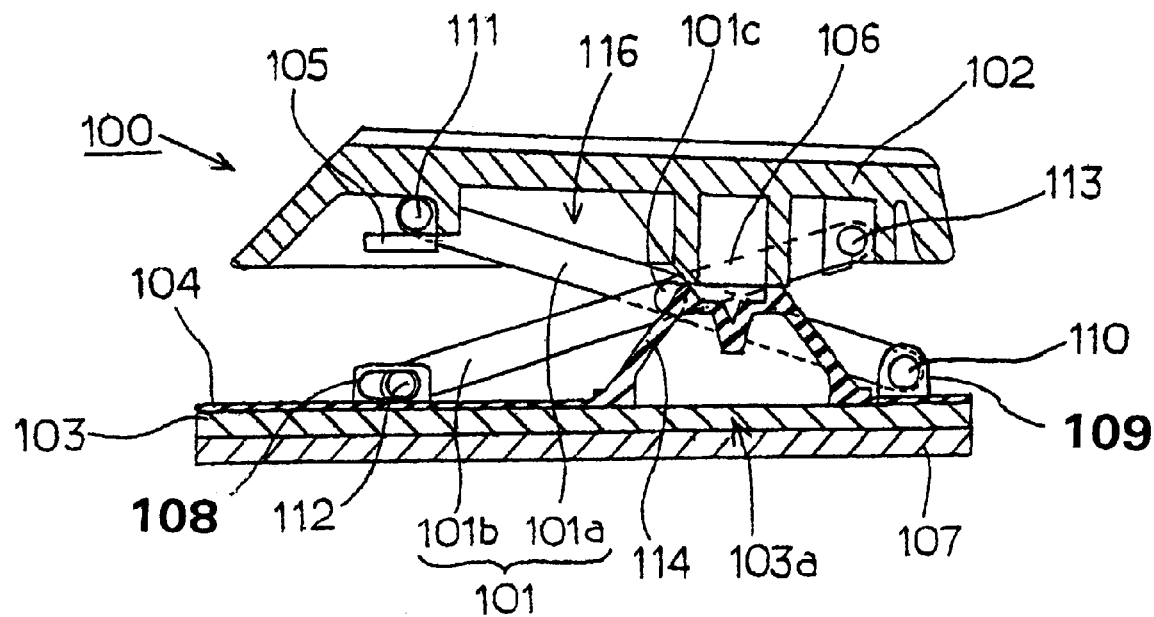
FIG. 7 is a cross-sectional view illustrating a prior art key switch in in a stand-by position.
Figure 8:
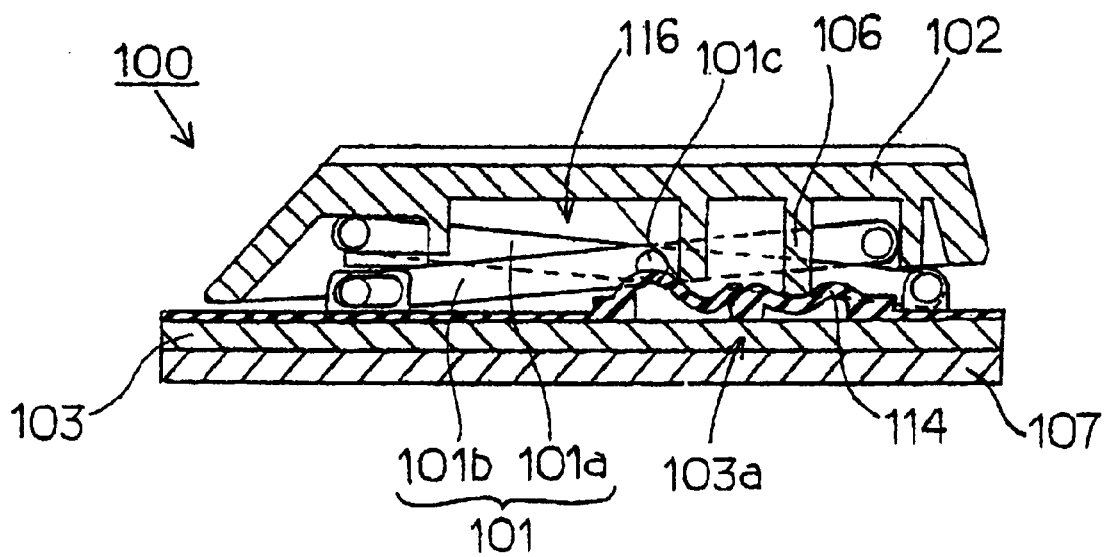
FIG. 8 is a cross-sectional view illustrating a prior art key switch in a depressed position.
Figure 9:
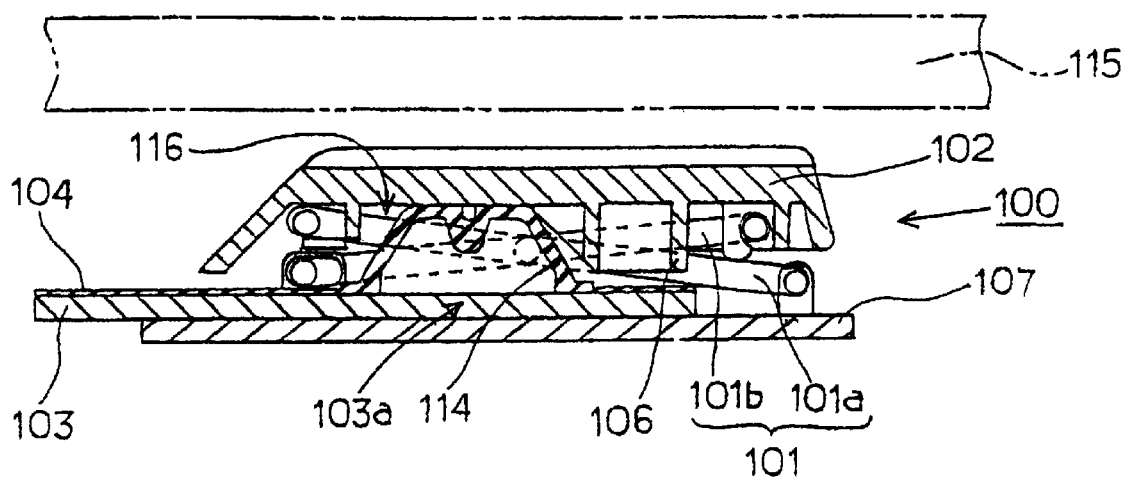
FIG. 9 is a cross-sectional view illustrating a prior art key switch in a retracted position.

As shown in FIGS. 5 and 6, a keyboard switch 1, having a plurality of key switches 10 each with a key top 2, is contained within device case 14. Switch sheet 3 is slidable back and forth in response to the opening and closing of lid 29 by means of a conversion mechanism provided at a connecting portion between switch sheet 3 lid 29, and device case 14. The conversion mechanism is shown in the top left portion of FIG. 5.

The conversion mechanism contains a cylindrical cam 25 that rotates integrally with a pivot axis (not shown) for pivotally supporting lid 29. Cylindrical cam 25 contains a crank-shaped cam grove 25a bored in cylindrical cam 25. A slider 26, having a follower 26a, is fit from inside cylinder cam 25 into cam grove 25. A slide angle 27, rigidly formed in the shape of an inverted English letter "L", is fixedly attached to slider 26.

An upper and left edges of switch sheet 3, shown in FIG. 5, are fixedly pressed against a bent grove along the inside of slide angle 27. This allows flexible switch sheet 3 to slide in conjunction with slide angle 27. Consequently when lid 29 moves, the conversion mechanism actuates and slider 26 reciprocates in a straight line (to the left and right of FIG. 6). As slider 26 reciprocates, switch sheet 3 slides in conjunction with slider 26.

Closing lid 29 causes switch sheet 3, moving in conjunction with slider 26, to slide (downward in FIG. 5 and leftward in FIG. 6) from the stand-by position, shown by the dashed line, to the retracted position, shown by the solid line.

Opening lid 29 causes switch sheet 3 and slider 26 to slide from the retracted position shown by the solid line to the stand-by position shown by the dashed line.

Additionally referring now to FIGS. 1 through 4. Opening lid 29 causes rear edges 12a of engagement holes 16, in contact with trailing claw pieces 15, to retract rightward and release restraint on trailing claw pieces 15. At the same time, the sliding of switch sheet 3, described above, causes the free end of plate spring piece 24 to escape from retracting hole 17, and allow contact portion 24a to elastically contact switch sheet 3. Consequently, the elasticity of plate spring piece 24 causes cross-link 13 to be pushed upward and key top 2 to return to the stand-by position. Furthermore, the sliding of switch sheet 3 causes dish spring 4 and membrane switch portion 3a to return to contact portion 24a of plate spring piece 24. Thus the elastic pressure of contact portion 24a and dish spring 4 allows key switch 10 to return to the stand-by position of FIG. 1.

The present invention may be modified with respect to the aforementioned embodiment. For example, the present invention moves the switch sheet 3 in response to lid 29 movement. Alternatively, lid 29 movement may move support plate 18. In a second example, plate spring piece 24 both allows key top 2 to return to a stand-by position and serves as an actuator for actuating the key top 2. Alternatively an actuator for key top 2 may be connected separately to key top 2 or differently to cross-link 13.

Furthermore, the aforementioned embodiment employs dish spring 4 to actuate membrane switch portion 3a, alternatively, dish spring 4 may be inverted and still sustain the actuating operation of membrane switch portion 3a. Additionally, it is not necessary to provide dish spring 4 at membrane switch portion 3a, contact portion 24a may independently actuate membrane switch 3a.

The aforementioned embodiment employs cylindrical cam 25 and slider 26 as an interlock mechanism for allowing switch sheet 3 to slide in conjunction with lid 29 motion. However, other interlock mechanisms containing, for example, a connective bevel gear or the like may be employed.

Additionally, when keyboard switch 1 is accommodated inside device case 14, key top 2 may be kept in a lowered state using switch sheet 3 or support plate 18 without the need for a special complicated structure. Accordingly, this lowered state prevents key top 2 from interfering with closed lid 29 and prevents both key tops 2 and, for example a liquid crystal display, disposed on the reverse side of lid 29 from being damaged.

Additionally, since plate spring piece 24 serves both as a return spring means and as an actuator for depressing and actuating membrane switch portion 3*a* the number of parts used reduced and the structure is simplified.

Additionally, since sliding switch sheet 3 retracts plate spring, piece 24 lid 29 may be actuated a small amount of force.

Additionally, switch sheet 3 may be guided in the sliding direction without providing a separate guide member thus further simplifying construction.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

What is claimed is:

1. A keyboard switch, comprising:
   a device case having a support plate;
   at least one key top;
   said key top having a cross link;
   said cross-link connecting said support plate and said key top;
   said cross-link guiding said key top from a stand-by position to a retracted position;
   a switch sheet slidable on said support plate provides at least one switch portion actuated by said key top and enabling electrical connection therethrough;
   at least one return spring in said keyboard switch contacting said switch sheet and biasing said key top away from said switch sheet;
   means for sliding said switch sheet relative to said support plate from a first position to a second position in response to a closing operation of a lid;
   at least one retracting hole in said switch sheet under said key top; and
   said return spring aligning with said retracting hole when said switch sheet is in said second position, whereby pressing of said switch portion and said enabling is inhibited.

2. The keyboard switch according to claim 1, further comprising:
   at least one engagement hole in said switch sheet;
   said engagement hole having a peripheral edge;
   at least one trailing claw piece on said cross-link;
   said trailing claw piece fitting into said engagement hole at said first position; and
   said trailing claw piece contacting said peripheral edge during said closing operation, thereby causing said cross-link to submerge and said key top to lower.

3. The keyboard switch according to claim 1, further comprising:
   at least one guide slit in said switch sheet corresponding to at least one support projection formed from said support plate; and
   said guide slit guiding said switch sheet past said support projection during said operation of said lid.

4. The keyboard switch according to claim 1 wherein:
   said return spring is an elongated plate spring supported in a cantilever manner by said key top;
   said return spring having a free end elastically contacting said switch portion in said stand-by position; and
   said free end actuating said switch portion in response to depressing said key top.

5. The keyboard switch according to claim 1 wherein:
   said return spring is an elongated plate spring supported in a cantilever manner by said cross-link;
   said return spring having a free end elastically contacting said switch portions at said stand-by position; and
   said free end actuating said switch portion in response to depressing said key top.

6. The keyboard switch according to claim 1, wherein:
   said switch sheet slides between said first position and said second position in response to an operation of said lid.

7. A keyboard switch comprising:
   a support plate inside a device case containing a lid;
   said support plate supporting a plurality of key switches;
   said key switch having a key top a connective cross-link and an integrally formed return spring;
   said return spring urging said key top upwardly from a depressed position to a stand-by position;
   said cross-link mounted between a plurality of support projections formed on said support plate and on said key top;
   said cross-link guiding said key top from said stand-by position to said depressed position;
   a switch sheet provided with a plurality of switch portions actuated by said return springs in response to a downward key top motion;
   said switch sheet arranged slidably on said support plate to avoid contact with said support projections; and
   an interlock for sliding said switch sheet relative to said support plate between said stand-by position and a retracted position guided by said support projections and actuated by an operation of said lid.

8. A keyboard switch system according to claim 7, wherein:
   said return spring is integral with said cross-link;
   said return spring having a free end contact portion and an elongated plate spring portion cantilevered from said cross-link; and said contact portion actuated by said contact portion in response to said downward key top motion.

9. A keyboard switch system according to claim 8, wherein said switch sheet further comprises:
   at least one dish spring each formed over said switch portion;
   said dish spring being elastic;
   said dish spring elastically contacting said contact portion of said return spring in said stand-by position;
   said dish spring providing partial upward bias thereby assisting said return spring to return said key top from said depressed position to said stand-by position; and
   said dish spring providing abrasive protection for said switch portion.

10. A keyboard switch system according to claim 7, wherein:
    said return spring is integral with said key top;
    said return spring having a free end contact portion and a spring portion; and
    said contact portion actuated by said contact portion in response to said downward key top motion.

11. A keyboard switch system according to claim 10, wherein said switch sheet further comprises:
    at least one dish spring each formed over said switch portion;
    said dish spring being elastic;
    said dish spring elastically contacting said contact portion of said return spring in said stand-by position;
    said dish spring providing partial upward bias thereby assisting said return spring to return said key top from said depressed position to said stand-by position; and
    said dish spring providing abrasive protection for said switch portion.

12. A keyboard switch system according to claim 7, wherein said switch sheet further comprises:
    at least one retracting hole corresponding to said return spring;
    said retracting hole accommodating a portion of said return spring when said keyboard switch system is in said retracted position; and
    at least one guide slits accommodating said support projections in response to said operation of said lid.

13. A keyboard switch system according to claim 12, wherein said switch sheet further comprises:
    a plurality of engagement holes each having a rear edge;
    each said engagement hole containing a corresponding trailing claw piece integrally provided on each said cross-link; and
    said engagement hole accommodating said trailing claw piece in said stand-by position; and
    said rear edge contacting said claw piece and lowering said key top in response to said operation of said lid.

14. A keyboard switch system according to claim 7, wherein said interlock further comprises:
    a cylindrical cam that rotates with a pivot axis for pivotally supporting said lid;
    said cylindrical cam containing a crank-shaped cam grove;
    a slider having a follower fitting inside said cylindrical cam and movably captured in said cam grove;
    a rigid slide angle fixedly attached to said slider;
    said switch sheet fixedly attached to said slid angle allowing said switch sheet to slidably reciprocate with said slide angle; and
    said interlock causing said switch sheet to slide over said support plate and retract said key tops in response to said operation of said lid.

15. A switch comprising:
    a support plate;
    a switch sheet slideable on said support plate between a first position and a second position;
    at least one key top;
    a linkage supporting said key top with respect to said support plate;
    said linkage resiliently urging said key top away from said switch sheet;
    a membrane switch under said key top;
    contacting means associated with at least one of said key top and said linkage for compressing said membrane switch when said key top is pressed toward said switch sheet when said switch sheet is in said first position, thereby enabling electrical connection therethrough;
    at least one retracting hole in said switch sheet; and
    said contacting means aligning with said retracting hole when said switch sheet is in said second position, whereby pressing of said membrane sheet and said enabling is inhibited.

16. A switch according to claim 15, wherein:
    said linkage including means for moving said key top into a retracted position when said switch sheet is in said second position.

17. A switch according to claim 15, further comprising:
    a cover;
    said cover being openable and closeable;
    means for moving said switch sheet into said first position when said cover is opened, and for moving said switch sheet into said second position when said cover is closed; and
    said linkage moving said key top into a retracted position when said cover is closed.

18. A switch comprising:
    a support plate;
    a switch sheet slideable on said support plate between a first position and a second position;
    at least one key top;
    a linkage supporting said key top with respect to said support plate;
    said linkage resiliently urging said key top away from said switch sheet;
    a membrane switch under said key top;
    contacting means associated with at least one of said key top and said linkage for compressing said membrane switch when said key top is pressed toward said switch sheet when said switch sheet is in said first position, thereby enabling electrical connection therethrough;
    at least one retracting hole in said switch sheet;
    said contacting means aligning with said retracting hole when said switch sheet is in said second position, whereby pressing of said membrane sheet and said enabling is inhibited; and
    said contacting means misaligning with said membrane switch when said switch sheet is in said second position, whereby said contacting means is rendered incapable of depressing and actuating said membrane switch in said second position.

* * * * *